United States Patent [19]

Widerby

[11] 3,724,886
[45] Apr. 3, 1973

[54] JOINT BETWEEN FIREPROOF AND PRESSURETIGHT WALL AND CEILING ELEMENTS

[75] Inventor: Lennart Widerby, Jonkoping, Sweden

[73] Assignee: Aktiebolaget Svenska Flaktfabriken, Nacka, Sweden

[22] Filed: May 14, 1971

[21] Appl. No.: 143,555

[52] U.S. Cl..............287/189.36 D, 52/464, 52/584, 85/1 L, 287/189.36 F
[51] Int. Cl.................................................F16b 5/02
[58] Field of Search.........287/189.36 D, 189.36 C, 287/189.36 F, 189.36 H, 189.35; 52/461, 463, 464, 489, 496, 584; 85/1 L, 1 H

[56] References Cited

UNITED STATES PATENTS

| | | |
|---|---|---|
| 1,511,764 | 10/1924 | Jordahl............................287/189.35 |
| 2,800,983 | 7/1957 | Toney....................................52/464 |
| 3,423,896 | 1/1969 | Widerby..........................52/584 X |

*Primary Examiner*—David J. Williamowsky
*Assistant Examiner*—Wayne L. Shedd
*Attorney*—Howson and Howson

[57] ABSTRACT

A joint between fireproof and pressuretight elements consisting of sheet metal covers enclosing an insulating filler and having U-shaped slots at their joining ends and being joined together by two U-shaped clamping sections pressed against the slots by bolts, which are T-shaped and flat, the head of which resting against the inside of the outer section and being somewhat wider than said section internally, whereby the bolt can be inserted from the inside of said elements and during the screwing-on of a nut on the bolt be brought into contact with the inner walls of the section.

1 Claim, 1 Drawing Figure

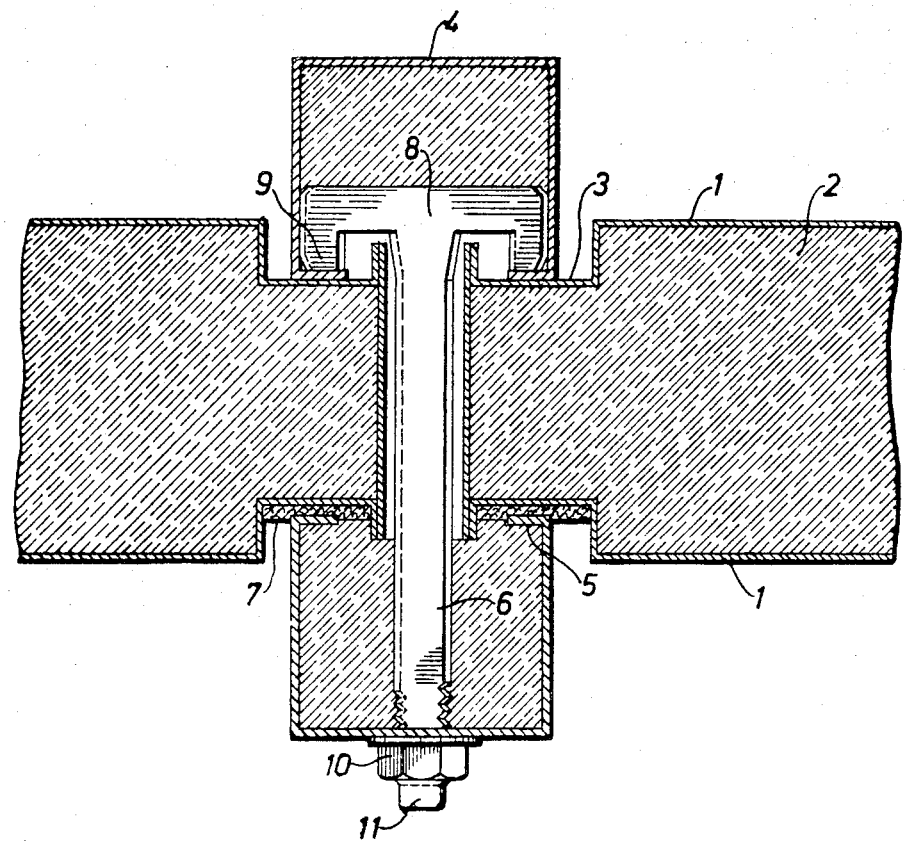

JOINT BETWEEN FIREPROOF AND PRESSURETIGHT WALL AND CEILING ELEMENTS

This invention relates to a new and improved execution of a joint between fireproof and pressuretight wall and ceiling elements for machine-rooms for fans or the like, the which elements consist of rectangular sheet metal covers enclosing a fireproof, heat- and sound-insulating filler and, along two opposing longitudinal sides, having U-shaped slots and being joined together by two U-shaped clamping sections, the shanks of which are bent to form surfaces of contact and are held pressed against the bottom of the slots by a number of bolts.

In the Swedish laid-out Specification No. 312 217, a device is described for joining together of fireproof and pressuretight elements for the building of machine-rooms for fans or the like. Walls and ceilings consist of a number of elements joined together by means of U-shaped clamping sections resting against the insides and outsides of the wall or ceiling and pairwise pressed against longitudinal slots in meeting edges of the elements by means of specially shaped through-bolts, so forming a reliable, fireproof and pressuretight joint between the elements.

The special form of the bolts consists in the fact that the inner portion of the bolt-head has a square section which fits into corresponding square holes in the clamping sections and prevents the bolt from rotating during screwing on of the nut in conjunction with assembly. The special form of the bolt involves a not insignificant addition to the expense of the joint. The same applies to the square holes in the clamping sections.

Another disadvantage of the through-bolts is that they must be passed into the holes of the clamping sections from outside, which requires both space outside the wall or ceiling and the cooperation of two men for the assembly.

According to the invention these disadvantages are avoided in that the bolt is T-shaped and, with its head, grips the outer clamping section internally instead of externally, and through the fact that the head is rather too large to be turned round inside the clamping section. No hole need therefore be made in the clamping section and the bolt can be brought into position from the inside of the wall or ceiling during assembly by a single man. To render the joint still cheaper, the bolt is made in the form of a flat bolt stamped out of plate, the thread having the form of teeth with thread profile along the longitudinal sides.

The invention will now be described with reference to the attached drawing, which shows in section a joint between two elements. On the drawing 1 indicates a rectangular sheet metal cover with given standardized dimensions which encloses a heat- and sound-insulating, fireproof filler 2. The sheet metal cover with filler constitutes a wall or ceiling element which is joined to similar elements to form entire ceilings and walls. For jointing purposes the sheet metal cover of the element has U-shaped slots 3 and the elements are held together by clamping sections 4 which, with their folded edges 5, lie against the bottom of the slots 3. The sections 4 are pressed against the bottom of the slots 3 by bolts 6 stamped out of plate and which, turned through 90° to the plane of the paper, are inserted from the inside of the wall — downwards in the drawing — before attachment of the inner clamping section. For sealing of the joint the inner bottom is coated with a sealing material 7.

The head 8 of bolt 6 has feet 9 which rest from inside against the outer clamping section — the upper clamping section in the drawing — at its bent-back edges 5. The pressure of the clamping sections 4 against the bottom of the slots 3 is adjusted to the desired value with the nut 10, which is locked by bending the free end 11 of the bolt roughly perpendicular to the longitudinal direction of the bolt.

The bolt 8 is rather wider than the clamping section 4 internally and is therefore prevented from rotating in conjunction with assembly. In final state, therefore, it will be somewhat oblique as shown by the double contours in the drawing. For tightening of the nut, accordingly, no separate holding tool is required on the bolt. As the bolt is placed in position from inside, no space is required outside or above the outer clamping section 4 and the assembly can be done by a single man.

What is claimed is:

1. A joint between fireproof and pressuretight wall and ceiling elements for machine-rooms for fans or the like, which elements consist of rectangular sheet metal covers enclosing a fireproof, heat-and sound- insulating filler and, along two opposing longitudinal sides, have longitudinal flanges defining transverse U-shaped slots said opposing sides being joined together by two longitudinal clamping sections which are U-shaped in transverse cross section, the shanks of which are bent inwardly to form surfaces of contact having a gap therebetween, and a plurality of bolts to press said surfaces of contact against the bottom of the slots, characterized in that the bolts are T-shaped and flat and have a head perpendicular to the longitudinal direction of the bolt, which head has thickness less than the gap between surfaces provided by the bent-inwardly surfaces of the clamping section and is wider than the internal distance between the inner walls of the shanks of said section, whereby, for purposes of assembly, the bolt can be inserted from the inside of the wall or ceiling through the gap between the surfaces and thereafter, by rotation, can be brought into contact with the inner walls of the section so as to rest against them during the subsequent screwing-on of a nut securing the two clamping sections.

* * * * *